United States Patent [19]
Hufford et al.

[11] Patent Number: 5,693,902
[45] Date of Patent: Dec. 2, 1997

[54] AUDIO BLOCK SEQUENCE COMPILER FOR GENERATING PRESCRIBED DURATION AUDIO SEQUENCES

[75] Inventors: Geoffrey Calvin Hufford; Christopher P. Hufford; Kevin C. Klingler, all of Chatsworth, Calif.

[73] Assignee: Sonic Desktop Software, Chatsworth, Calif.

[21] Appl. No.: 532,527

[22] Filed: Sep. 22, 1995

[51] Int. Cl.[6] ........................................... G10H 7/00
[52] U.S. Cl. ................... 84/650; 84/634; 84/609; 84/610
[58] Field of Search ................... 84/609, 610, 634, 84/649, 650, 615, 653

[56] References Cited

U.S. PATENT DOCUMENTS

| | | | |
|---|---|---|---|
| 5,300,725 | 4/1994 | Manabe | 84/609 |
| 5,455,378 | 10/1995 | Paulson et al. | 84/610 |
| 5,521,323 | 5/1996 | Paulson et al. | 84/610 |

OTHER PUBLICATIONS

Tune Builder 1.1 For MAC User Manual, Airworks Corporation.
Tune Builder Self–Editing Music System, Airworks Corporation.
Arpeggio Self–Editing Music System, Airworks Corporation.
Tunebuilder Custom Airworks Corporation.

*Primary Examiner*—William M. Shoop, Jr.
*Assistant Examiner*—Marlon T. Fletcher
*Attorney, Agent, or Firm*—Freilich, Hornbaker & Rosen

[57] ABSTRACT

An audio block sequence compiler for selecting a plurality of audio blocks to generate a sequence having a duration corresponding to user-prescribed criteria. In a preferred embodiment, a user chooses an audio, e.g., a musical, segment from a predefined audio library and prescribes the duration of an audio sequence. Prior to depositing each musical segment in the library, the musical selection is divided into audio blocks that are identified in a corresponding encoding table with characteristics including (1) duration, (2) suitability for being used as a beginning or ending of an audio sequence, and (3) musical compatibility with each audio block. Using this characteristic table and the user-prescribed criteria, i.e., duration, the audio block sequence compiler generates a plurality of audio sequences satisfying the user-prescribed criteria which can be reviewed, e.g., played, and/or saved for future use.

21 Claims, 6 Drawing Sheets

|  | A | B | C | D | E | F | G | H | I | J |
|---|---|---|---|---|---|---|---|---|---|---|
| DURATION ~30 | 5 | 5 | 5 | 5 | 5 | 5 | 5 | 5 | 5 | 5 |
| BEGINNING/ END ~32 | B |  | B |  | E |  |  |  |  | E |
| COMPATIBILITY LIST ~34 | B | C | D | E | F | G H | H J | E I | J |  |

FIG. 4

|   | 0 | 1 | 2 | 3 | 4 | 5 | 6 | 7 | length | |
|---|---|---|---|---|---|---|---|---|---|---|
|   | A |   |   |   |   |   |   |   | length = 5 | A is the first block considered and it is a beginning so it is put in slot 1 |
|   | A | B |   |   |   |   |   |   | length = 10 | B is considered next and it is checked for compatibility with A |
|   | A | B | C | D | E | F | G |   | length = 30 | slots continue to be filled until... |
|   | A | B | C | D | E | F | G | H | length = 35 | the length is >= the desired length |
|   | A | B | C | D | E | F | G | H | length = 35 | H is checked as an ending, it is not so it is removed |
|   | A | B | C | D | E | F | G |   | length = 30 | I is tried and not compatible with G, so J is tried next |
| ** | A | B | C | D | E | F | G | J | length = 35 | *** J is compatible with G and it is an ending, so this sequence is returned ** |

A SEQUENCE IS RETURNED

|   | 0 | 1 | 2 | 3 | 4 | 5 | 6 | 7 | length | |
|---|---|---|---|---|---|---|---|---|---|---|
|   | A | B | C | D | E | F | G |   | length = 30 | to continue looking for the next combination, J is removed |
|   | A | B | C | D | E | F | G |   | length = 30 | J is the last block so A is tried next... |
|   | A | B | C | D | E | F | G |   | length = 30 | blocks A - G are tried (H was the first one tried in this slot) and none are compatible |
|   | A | B | C | D | E | F |   |   | length = 25 | so G is removed from slot 6 |
|   | A | B | C | D | E | F | H |   | length = 30 | H is compatible with F, so it is put in slot 6 |
|   | A | B | C | D | E | F | H | * | length = 30 | I, J, A, B, C, D are all tried in slot 7 and either not compatible or not endings |
| ** | A | B | C | D | E | F | H | E | length = 35 | *** E is both compatible and an ending, so this sequence is returned ** |

PROCESS CONTINUES...

|   | 0 | 1 | 2 | 3 | 4 | 5 | 6 | 7 | length | |
|---|---|---|---|---|---|---|---|---|---|---|
|   | C |   |   |   |   |   |   |   | length = 5 | basic SEEDING is performed by putting another beginning block in the first slot |
| ** | C | D | E | F | G | H | I | J | length = 35 | *** and building a sequence from there. ** |

FIG. 5

AUDIO BLOCK SEQUENCE COMPILER FOR GENERATING PRESCRIBED DURATION AUDIO SEQUENCES

COPYRIGHT NOTICE

This patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

The present invention relates generally to hardware/software systems of the type used to generate audio sequences and in particular for generating audio sequences of prescribed durations that are of particular use for creating soundtracks in multimedia systems, e.g., in an audio/video environment.

In an exemplary audio/video environment, a visual sequence, e.g., a movie/video clip, is combined with an audio background. However, visual sequences are often repetitively edited before an aesthetically satisfactory sequence is achieved. The audio sequence must then be edited to match the duration of the edited video sequence. With an available orchestra, this process can be repeated as often as necessary but it is very expensive. In a more restricted environment, e.g., a multimedia video game, this procedure is often too costly and cumbersome.

SUMMARY OF THE INVENTION

The present invention is directed toward an audio block sequence compiler for selecting a plurality of suitable, compatible audio blocks to generate an audio sequence having a duration corresponding to user-prescribed criteria.

In a preferred embodiment, a user using a keyboard/mouse interface chooses an audio, e.g., a musical, segment from a predefined audio library and prescribes the duration of an audio sequence. Prior to depositing each musical segment in the library, the musical selection is divided into audio blocks that are identified in a corresponding encoding table with characteristics including (1) duration, (2) suitability for being used as a beginning or ending of an audio sequence, and (3) musical compatibility with each audio block. Using this characteristic table and user-prescribed criteria, i.e., duration, the audio block sequence compiler, preferably a software program executed by a computer, generates a plurality of audio sequences satisfying the user-prescribed criteria which can be reviewed, e.g., played or displayed, and/or saved for future use.

In a further aspect of a preferred embodiment, the characteristic table additionally contains a mood parameter that is user prescribed and used by the audio block sequence compiler to generate an audio sequence of a selected mood.

In a still further aspect of a preferred embodiment, the encoding table additionally contains a parameter that identifies blocks that are fadeable. When a fadeable block is selected as an end block, the audio block sequence compiler can truncate the fadeable end block to generate an audio sequence of the prescribed length which might otherwise not be achievable.

In a further aspect of a preferred embodiment, the encoding table additionally contains an intensity parameter that, when selected by the operator, is used by the audio block sequence compiler to generate an audio sequence that most closely matches a user-prescribed intensity curve.

In a still further aspect of a preferred embodiment, each block can be identified in the encoding table as having a hit point that defines the location (when present) of an intensity burst. When prescribed by the user, the audio block sequence compiler can use the hit point parameter to place an intensity burst at a user-prescribed location in the generated audio sequence.

Other features and advantages of the present invention should become apparent from the following description of the presently-preferred embodiments, taken in conjunction with the accompanying drawings, which illustrate, by way of example, the principles of the present invention.

BRIEF DESCRIPTION OF THE DRAWINGS

FIG. 4 is an exemplary encoding table for a fifty second source audio segment; and FIG. 5 shows the iterations performed by the audio block sequence compiler according to the flow chart of FIG. 3B on the data of the encoding table of FIG. 4.

DESCRIPTION OF THE PREFERRED EMBODIMENTS

Figure 1:
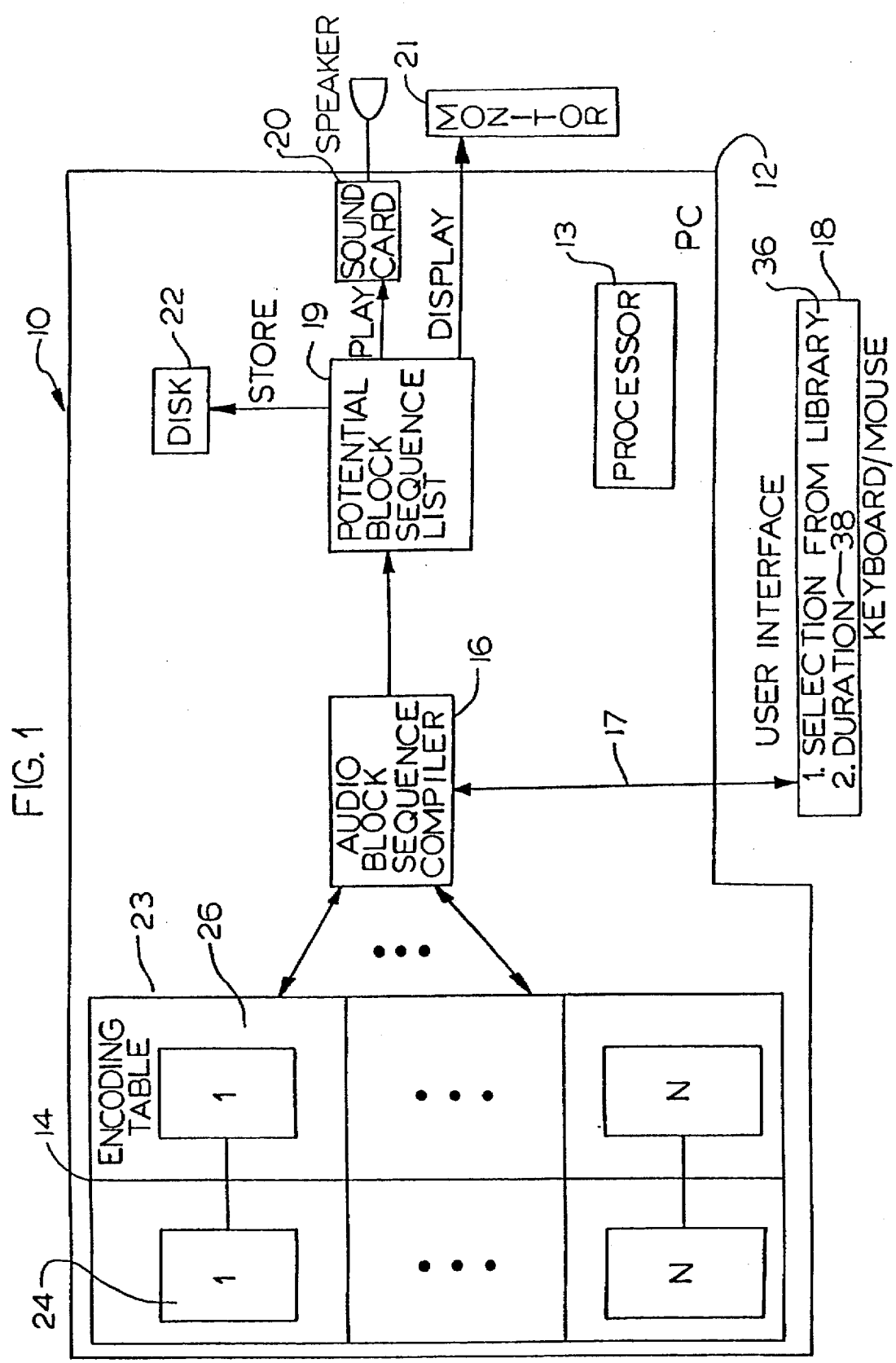
FIG. 1 comprises a functional block diagram of an audio block sequence compiler system in accordance with the present invention for generating audio sequences having user-prescribed durations.

With reference now to the drawings, and particularly to FIG. 1, there is shown a block diagram of a preferred embodiment of an audio sequence generator 10 of the present invention. In a preferred embodiment, the audio sequence generator 10 is comprised of a computer-executed software program, generally initially present on a floppy disk, and finally residing on the hard disk of a personal computer (PC) 12, e.g., a Macintosh or IBM compatible PC, controlled by a processor 13. As such the following discussion, relates to this preferred PC environment. However, different computer platforms or hardware only implementations are also considered within the scope of the presently preferred invention.

The audio sequence generator 10 is primarily comprised of 1) an audio library 14 and 2) an audio block sequence compiler 16. In operation, a user via a user interface 17, e.g., a keyboard/mouse 18, chooses a source segment from the audio library 14 and prescribes a duration. This information is communicated to the audio block sequence compiler 16 which, under control of a software program executed by the processor 13 in the PC 12, fetches blocks of audio data from the audio library 14 and according to compilation criteria described further below generates a list of potential audio sequences that are preferably temporarily stored within a potential block sequence list depository 19. At that point, the user can select to play via a sound card/speaker 20 or review via a monitor 21 the potential block sequences and/or store selected sequences for future use, e.g., on a hard disk 22. Alternatively, the audio block sequence compiler 16 can compile a single block sequence until prompted by the operator to generate a next audio sequence.

Figure 2:
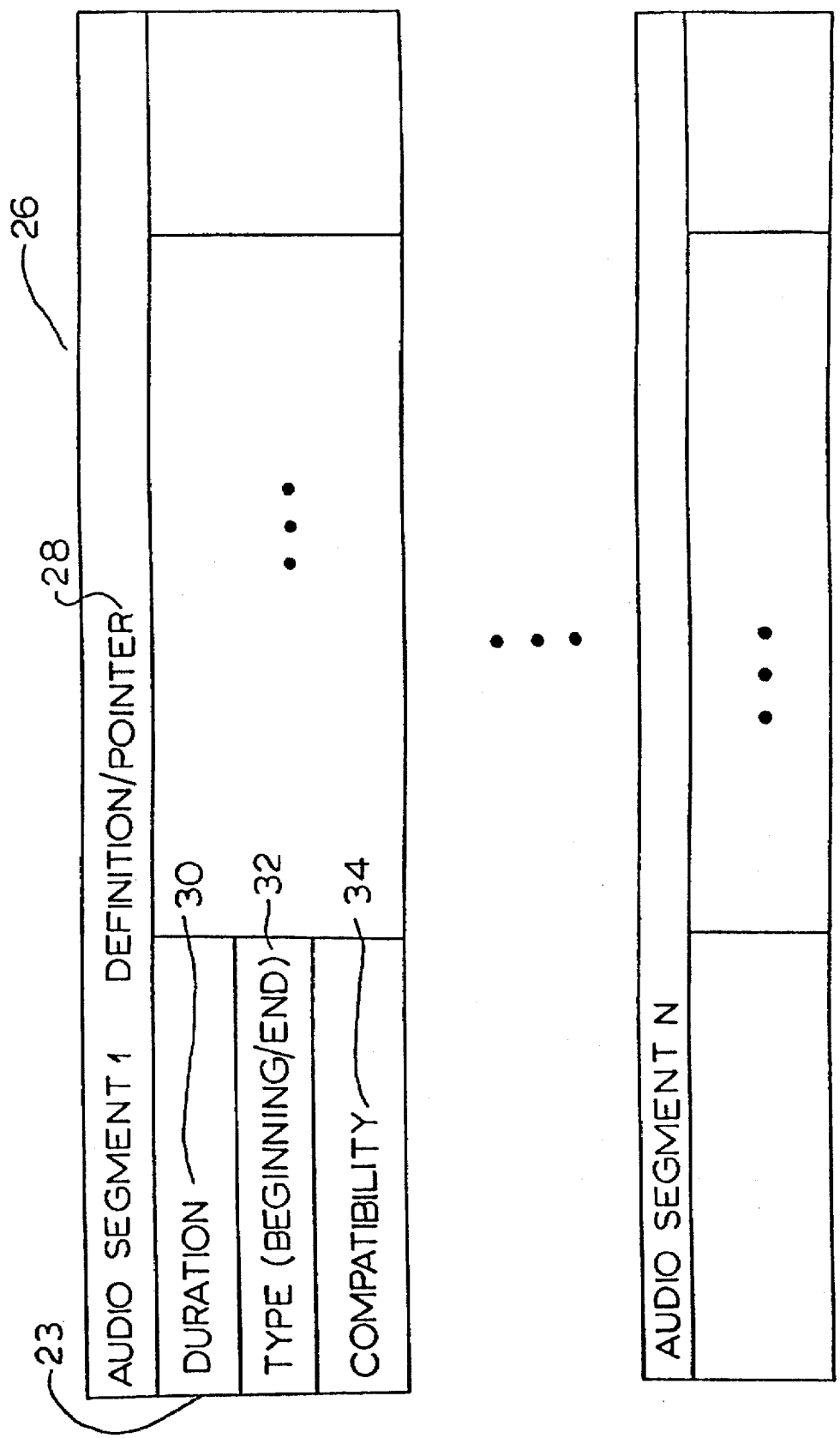
FIG. 2 is a simplified diagram of an encoding table showing the parameters associated with each audio block.

The audio library 14 preferably contains library entries 23 pertaining to a plurality of source audio segments. Each library entry 23 is comprised of 1) a source audio segment 24 and 2) an encoding table 26 which describes the partitioning of the source audio segment 24 into blocks and the characteristics of each block. Although, the source audio segment 24 is shown as being located within the library 14, one of ordinary skill in the art will recognize that the source audio segment 24 can alternatively be physically located outside of the library, e.g., on a CD, and referenced, e.g., by pointers, by the encoding table 26. FIG. 2 shows an exemplary structure for the encoding table 26. Each entry 23 in the encoding table 26 contains a definition/pointer 28 which includes identifying information for the library entry, e.g., a title and the physical location of the source audio segment 24, e.g., a CD file. Each encoding table entry 23 is further divided into a plurality of entries that define blocks, i.e., audio blocks, and associated characteristics for the audio from the source audio segment 24. In a simplified example, a source audio segment 24 is divided into five blocks: A, B, C, D, E, F where the sequence ABCDEF corresponds to the source audio segment 24. Although, other combinations of blocks, e.g., FEDCBA, also create audio sequences, not all sequences of blocks will create aesthetically reasonable audio sequences. Thus, it has been determined that information must be derived to determine the musical compatibility according to aesthetic criteria between each block, e.g., A, B, and each potential succeeding block, e.g., while block C may reasonably follow block B, it may not be aesthetically reasonable for it to follow block A. Additionally, while some blocks, e.g., A, are suitable according to aesthetic criteria to reasonably start a musical sequence, other blocks can not. Similarly, only certain blocks, e.g., F, are suitable according to aesthetic criteria to reasonably end a musical sequence. Lastly, not all source audio segments 24 can reasonably be divided into fixed length blocks. In fact, using reasonable aesthetic criteria, blocks will generally be differently sized. Consequently, audio sequences of many different durations can be achieved by combining different combinations of these differently-sized blocks. However, as previously described, the available combinations are limited by the compatibility between potentially adjacent blocks as well as their suitability to begin or end an audio sequence. Corresponding to these criteria, data in the encoding table 26 for each audio block contains parameters pertaining to a 1) a duration 30, 2) a type (beginning/end) 32, and 3) a list of compatible blocks 34, i.e., blocks that can aesthetically follow the current block. Additionally, information (not shown) identifying the physical location of each audio block in the source audio segment 24 is retained in the encoding table 26. While data in the encoding table 26 can be manually generated, automated procedures are also possible.

Figure 3A:
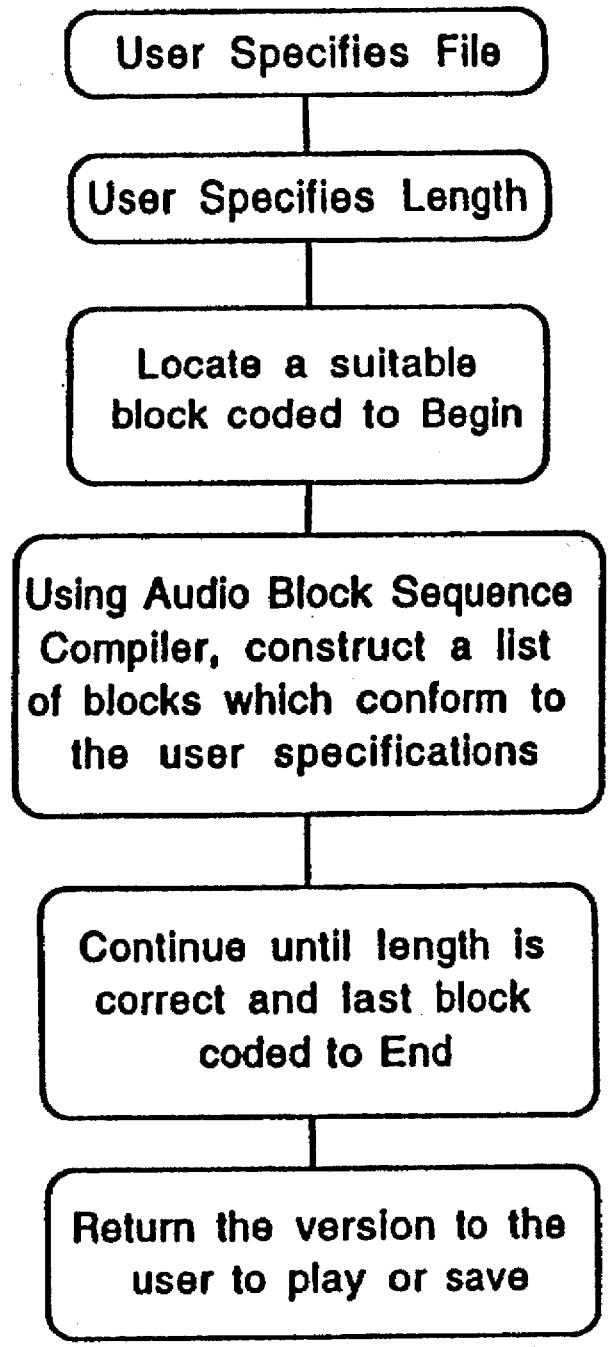
FIG. 3A is a simplified flow chart of the operation of the system of FIG. 1.
Figure 3B:
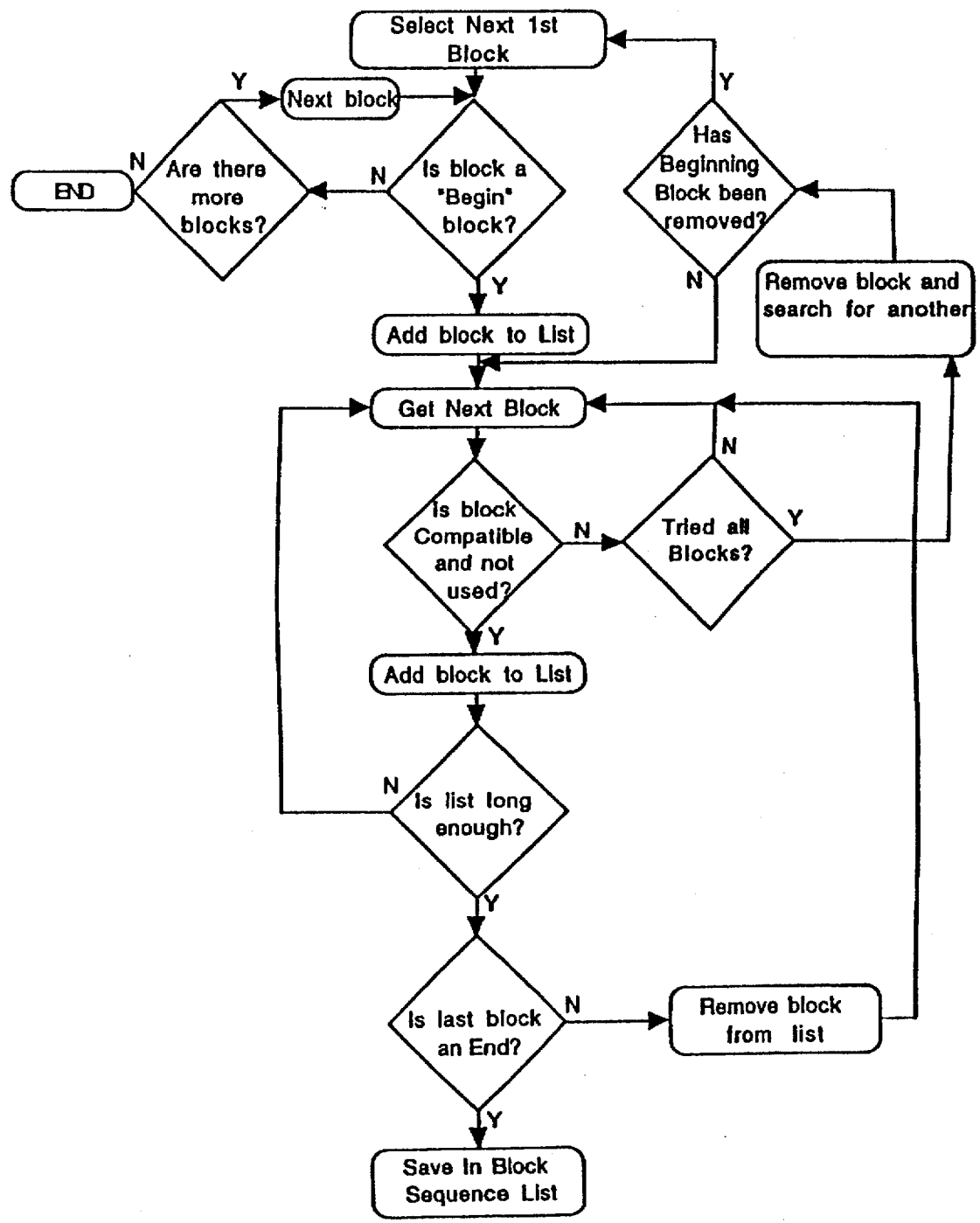
FIG. 3B is a simplified flow chart depicting the process implemented by the audio block sequence compiler.

FIG. 3B shows a simplified flow chart of the iterative process implemented by the audio block sequence compiler 16 after being provided the user-prescribed data (as shown in FIG. 3A). As previously described, after the user has determined a selection 36 from the library 14 and a duration 38, the audio block sequence compiler 16 operates on the data in the encoding table 26 according to the flow chart of FIG. 3B. Accordingly, a list of potential audio sequences is compiled and stored in the potential block sequence list 19.

FIG. 4 shows an exemplary encoding table for a fifty second source audio segment 24. In this example, the source audio segment is partitioned into ten blocks, each being five seconds long. (However, while fixed length blocks exist in this example, this is often not the case). In this example, Blocks A and C have been marked as potential beginnings and blocks E and J have been marked as potential endings.

In the example shown in FIG. 5, the user has selected a duration of thirty-five seconds for this source audio segment 24. Accordingly, FIG. 5 shows the iterations performed by the audio block sequence compiler on the encoding table of FIG. 4 according to the flow chart of FIG. 3B. FIG. 5 shows that the original audio sequence has now been rearranged into three potential sequences that each have the prescribed duration, begin with a beginning block and end with an ending block.

In an exemplary embodiment, the audio sequence generator 10 allows users to quickly and easily create movie or record quality music soundtracks for any application or document that can import sound. The audio sequence generator 10 is able to accomplish this by using the encoded music and input from the user. The user selects a musical style and sub-style from a list, then specifies the length (in minutes, seconds and tenths). A piece of music is selected from their library that meets the users needs and a custom version of that music is created that is exactly (within user-prescribed criteria) the specified length. If the user doesn't like the selected music, they can hear a different version of the same music or a different piece music—all of the versions presented will fit the specifications of the user.

By using music and its corresponding encoding table 26, and input from the user, the compiler 16 can customize the following aspects of the music:

The length of the music can be customized in tenths of second increments from seconds to hours.

Different versions of the same piece of music (sometimes hundreds of thousands of options) can be generated.

In an alternative embodiment, the compiler 16 can customize the intensity of the music. The user can define a graph of the intensity which they request on a timeline. This will allow them to have the program make a piece of music that begins softly (perhaps while an announcer speaks) and builds to a climax (perhaps when the narration has ended). In this embodiment, an intensity parameter is added to the encoding table 26 for each block and the audio block sequence compiler 16 selects blocks that most closely correspond to the prescribed intensity graph.

In an alternative embodiment, the user can specify and modify the mood of the music without changing any other characteristics. In this embodiment, a mood parameter is added to encoding table 14. Additionally, multiple renditions of the source audio segment 24 are prerecorded corresponding to different moods. The audio block sequence compiler 16 will then select renditions that correspond to the prescribed mood parameter.

In another alternative embodiment, a user can specify 20 seconds of background music followed by 12 seconds of introductory music. The program will be able to locate two different pieces of music and make a smooth, musical, transition between them.

In an additional alternative embodiment, blocks can be identified as fadeable blocks in the encoding table 26. When a block is fadeable, its duration can be truncated to become a satisfactory end block, even if its duration would normally be too long. The audio block sequence compiler 16 will then truncate the fadeable block to achieve the user-prescribed duration. Additionally, the intensity of the end of the fadeable block will fade at a prescribed rate to reduce the effects of the truncation.

In still another embodiment, each block can be identified in the encoding table 26 as having a hit point that defines the location (when present) of an intensity burst. When prescribed by the user, the audio block sequence compiler 16 can use the hit point parameter to place an intensity burst at a user-prescribed location in the generated audio sequence.

Appendix A is a software listing that describes an exemplary embodiment of the described invention. The following defines the data structure for each block of the encoding table in this exemplary embodiment:

| | |
|---|---|
| fileInfo | a pointer to which sound file this block is associated with |
| blockStart | the sample number within the sound file at which this block begins |
| blockLength | the number of samples that this block contains. The end sample number is derived by adding blockStart and blockLength |
| blockName | the name to display on this block (no longer than 15 characters |
| blockDesc | the long text description of this block (up to 63 characters) |
| compatibility | an array of bits specifying this block's compatibility with all other blocks in this file (described below) |
| usageFlags | bit flags indicating properties of this block (described below) |
| nextBlock | the block number of the best block to following this block |
| quickEnd | the block number of the best next block to end the music quickly |
| blockSection | a section number of this block assigned for use in grouping sub-blocks into grouped blocks for display |
| blockPriority | a priority number of this block assigned for use in displaying blocks at different detail levels |
| blockType | a set of bits specifying if this block should be displayed, if the block is in-use, and other status flags. USER_BLOCK_TYPE, INVISIBLE_BLOCK_TYPE, AVAILABLE_BLOCK_TYPE |
| selected | a True/False flag indicating if the block is currently selected |
| intensity | each block is assigned an intensity index in relation to the other blocks in the file. The higher the intensity number, the more intense the audio in the block is in relation to the other blocks. |
| hitPoint | the sample number, if any, of a musical "Hit" within the block. (0 for no significant hit) |
| moodIndex | a number grouping this blocks mood with other blocks mood. All blocks with the same moodIndex will have the same mood. |
| next | a pointer to the next block |

Compatibility

Each block has an array of unsigned longs which are used as an array of bits. Each bit corresponds to a block from the soundfile. Bit 0 corresponds to block 0, etc. Bit 15 should be set if the block is compatible with block 15. Compatible blocks are blocks which sound musically correct when they are played one after the other. For example, "Block A" should be flagged as compatible with "Block B" when it sound musically correct to listen to "Block A" followed by "Block B". If "Block B" was the 24th block from the soundfile, then bit 24 of "Block A"s compatibility array should be set.

| USAGEFLAGS | |
|---|---|
| DEAD_END_FLAG | Set if this block will lead you directly toward an ending. Set this bit if this block is a bad choice to build a long cue (1L<<0) |
| NEXT_CONTIGUOUS_FLAG | Set this bit if the next block doesn't need a crossfade to make a good sounding transition (1L<<1) |
| FADEABLE_BLOCK | Set this bit to signal that this block can be effectively faded (in volume) to any length. (1L<<2) |

| -continued | |
|---|---|
| USAGEFLAGS | |
| BEGINNING_BLOCK | Set this bit if the block is a good choice (sounds musically correct) to begin a selection (1L<<30) // 0x40000000 |
| ENDING_BLOCK | Set this bit if the block is a good choice to end a selection (1L<<31) // 0x80000000 |

While some of the above functions can be applied to existing music (through an encoding process) and some are dependent on a custom music library in which music is composed and performed in a specific format.

```
struct BlockStruct {
    SoundFileInfoPtr    fileInfo;  // pointer to file struct for this
                                   block
    unsigned long       blockStart;// sample number
    unsigned long       blockLength;// number of samples
    Str15               blockName;
    Str63               blockDesc;
    unsigned long       compatibility[COMPAT_SIZE];
    unsigned long       usageFlags;
    short               nextBlock;
    short               quickEnd;
    unsigned char       blockSection;
    unsigned char       blockPriority;
    BlockTypes          blockType;
    Boolean             selected;
    BlockStructPtr      next;
};
```

HINTING/WARNING

Using the encoded information in the blocks, the user is assisted by visually displaying information about the blocks. Block attributes including beginnings, endings and compatibility are all displayed.

Beginning—displayed by a stair-step pattern on the left edge of the block

Ending—displayed by a stair-step pattern on the right edge of the block

Compatibility—the rightmost end cap of a selection in the sequence window is colored and all of the compatible blocks in the block window will have their left end caps colored.

Warning—when two non-compatible blocks are next to each other, we display a red edge at their junction.

THE ENCODING PROCESS

The process of encoding of music and sound is both musical and technical. The encoding is used to provide as much information as possible about each piece of music or sound so that the program can make informed, musical decisions, when it manipulates the music according to requests from users. The encoding process includes the following:

1. Block Start and End: The beginning and ending of each discrete music section (block) is determined. This necessarily determines the length of each block. Listen to the piece of music and divide it into segments based on musical phrases and musical uses called blocks. On average there are fifteen blocks per minute of music.

2. Block Name: Code each block with a name and description.

3. Beginning Blocks: For each block a determination is made as to whether it would make a good way to start a musical section or phrase.

4. Ending Blocks: Same concept as that described for Beginning Blocks.

5. Block Compatibility: Each block is tested for its specific compatibility to each and every other block which comprise the source audio segment.
6. Intensity: Code each block's musical intensity relative to other blocks.
7. Fadeable Block: Each block has a determination made as to whether it sounds musically viable to fade or not.

Although the present invention has been described in detail with reference only to the presently-preferred embodiments, those of ordinary skill in the art will appreciate that various modifications can be made without departing from the invention. Accordingly, the invention is defined by the following claims.

We claim:

1. A system for generating an audio sequence having a prescribed duration, comprising:
    a table referencing one or more predefined audio segments wherein said table contains entries to partition each of said predefined audio segments into blocks;
    said table entries including data corresponding to the duration of each said block, the suitability for each said block to begin or end an audio sequence, and the compatibility of each said block to sequentially follow each other said block;
    a user interface for permitting a user to prescribe an audio sequence duration;
    an audio block sequence compiler for iteratively compiling a list of one or more audio sequences each comprised of a plurality of blocks selected according to said user-prescribed audio sequence duration such that each said audio sequence conforms with said table entries; and
    means for displaying said list.

2. The system of claim 1, additionally comprising means to store at least one said audio sequence from said list.

3. The system of claim 1, additionally comprising means to play a selected audio sequence from said list.

4. The system of claim 1, wherein said table additionally comprises data corresponding to a mood parameter for each said block and said user interface additionally prescribes a mood parameter and said audio block sequence compiler selects blocks according to said user-prescribed mood parameter.

5. The system of claim 1, wherein said table additionally comprises data corresponding to a fadeable parameter for each said block and said audio block sequence compiler can select a fadeable block as an ending block and wherein said fadeable blocks can be truncated to achieve audio sequences of said user-prescribed audio sequence duration.

6. The system of claim 1, wherein said table additionally comprises data corresponding to an intensity parameter for each said block and said user interface additionally prescribes an intensity curve and said audio block sequence compiler selects blocks according to said user-prescribed intensity curve.

7. The system of claim 1, wherein said table additionally comprises data corresponding to a hit point parameter for each said block for specifying when an intensity burst is present within said block and said user interface additionally prescribes an intensity burst location and said audio block sequence compiler selects the sequence of said blocks according to said user-prescribed intensity burst location.

8. A system for generating an audio sequence having a prescribed duration, comprising:
    a storage device for storing a table referencing one or more predefined audio segments wherein said table contains entries to partition each of said predefined audio segments into blocks;
    said table entries including data corresponding to the duration of each said block, the suitability for each said block to begin or end an audio sequence, and the compatibility of each said block to sequentially follow each other said block;
    a user input device for permitting a user to prescribe an audio sequence duration;
    a processor for iteratively compiling a list of one or more audio sequences each comprised of a plurality of blocks selected according to said user-prescribed audio sequence duration such that each said audio sequence conforms with said table entries;
    a monitor for displaying said list;
    an audio apparatus for playing a selected audio sequence from said list.

9. The system of claim 8, additionally comprising means to store at least one said audio sequence from said list.

10. The system of claim 8, additionally comprising means to play a selected audio sequence from said list using said audio apparatus.

11. The system of claim 8, wherein said table additionally comprises data corresponding to a mood parameter for each said block and said user interface additionally prescribes a mood parameter and said compiling means can select blocks according to said user-prescribed mood parameter.

12. The system of claim 8, wherein said table additionally comprises data corresponding to a fadeable parameter for each said block and said compiling means can select a fadeable block as an ending block and wherein said fadeable blocks can be truncated to achieve audio sequences of said user-prescribed audio sequence duration.

13. The system of claim 8, wherein said table additionally comprises data corresponding to an intensity parameter for each said block and said user interface additionally prescribes an intensity curve and said compiling means selects blocks according to said user-prescribed intensity curve.

14. The system of claim 8, wherein said table additionally comprises data corresponding to a hit point parameter for each said block for specifying when an intensity burst is present within said block and said user interface additionally prescribes an intensity burst location and said compiling means selects the sequence of said blocks according to said user-prescribed intensity burst location.

15. The system of claim 8 wherein said user input device additionally permits a user to prescribe an audio segment and said audio block sequence compiler compiles sequences each comprised of a plurality of blocks selected from said user prescribed audio segment.

16. The system of claim 1 wherein said user interface additionally permits a user to prescribe an audio segment and said processor compiles sequences each comprised of a plurality of blocks selected from said user prescribed audio segment.

17. A method for generating an audio sequence of a prescribed duration, comprising the steps of:
    providing at least one prerecorded audio segment;
    defining discrete blocks in said audio segment and indicating characteristics corresponding to the duration of each block;
    assigning to each block characteristics corresponding to the suitability of each block to begin or end an audio sequence and the compatibility of each said block to be sequentially followed by each other block;
    defining a desired duration for an output audio sequence; and iteratively compiling a list of one or more audio sequences each comprised of a plurality of blocks according to said desired duration such that each said audio sequence conforms with said characteristics of each block.

18. The method of claim 17 additionally comprising the step of selecting an audio segment and wherein said iteratively compiling step compiles sequences of blocks from those blocks corresponding to said selected audio segment.

19. The method of claim 17 additionally comprising the step of displaying said compiled list.

20. The method of claim 17 additionally comprising the steps of:

selecting an audio sequence from said compiled list; and playing said selected audio sequence.

21. A method for generating an audio sequence of a prescribed duration from an audio segment having predefined discrete blocks indicating characteristics corresponding to the duration of each block and preassigned characteristics corresponding to the suitability of each block to begin or end an audio sequence and the compatibility of each said block to be sequentially followed by each other block, comprising the steps of:

defining a desired duration for an output audio sequence; and iteratively compiling a list of one or more audio sequences each comprised of a plurality of blocks according to said desired duration such that each said audio sequence conforms with said characteristics of each block.

* * * * *

(12) EX PARTE REEXAMINATION CERTIFICATE (9108th)
United States Patent
Hufford et al.

(10) Number: US 5,693,902 C1
(45) Certificate Issued: Jul. 3, 2012

(54) AUDIO BLOCK SEQUENCE COMPILER FOR GENERATING PRESCRIBED DURATION AUDIO SEQUENCES

(75) Inventors: Geoffrey Calvin Hufford, Chatsworth, CA (US); Christopher P. Hufford, Chatsworth, CA (US); Kevin C. Klingler, Chatsworth, CA (US)

(73) Assignee: Smartsound Software, Inc., Northridge, CA (US)

Reexamination Request:
No. 90/012,215, Mar. 30, 2012

Reexamination Certificate for:
Patent No.: 5,693,902
Issued: Dec. 2, 1997
Appl. No.: 08/532,527
Filed: Sep. 22, 1995

(51) Int. Cl.
*G10H 1/00* (2006.01)

(52) U.S. Cl. .................... 84/650; 707/E17.009; 84/609; 84/610; 84/634
(58) Field of Classification Search .................... None
See application file for complete search history.

(56) References Cited

To view the complete listing of prior art documents cited during the proceeding for Reexamination Control Number 90/012,215, please refer to the USPTO's public Patent Application Information Retrieval (PAIR) system under the Display References tab.

*Primary Examiner* — Jason Proctor

(57) ABSTRACT

An audio block sequence compiler for selecting a plurality of audio blocks to generate a sequence having a duration corresponding to user-prescribed criteria. In a preferred embodiment, a user chooses an audio, e.g., a musical, segment from a predefined audio library and prescribes the duration of an audio sequence. Prior to depositing each musical segment in the library, the musical selection is divided into audio blocks that are identified in a corresponding encoding table with characteristics including (1) duration, (2) suitability for being used as a beginning or ending of an audio sequence, and (3) musical compatibility with each audio block. Using this characteristic table and the user-prescribed criteria, i.e., duration, the audio block sequence compiler generates a plurality of audio sequences satisfying the user-prescribed criteria which can be reviewed, e.g., played, and/or saved for future use.

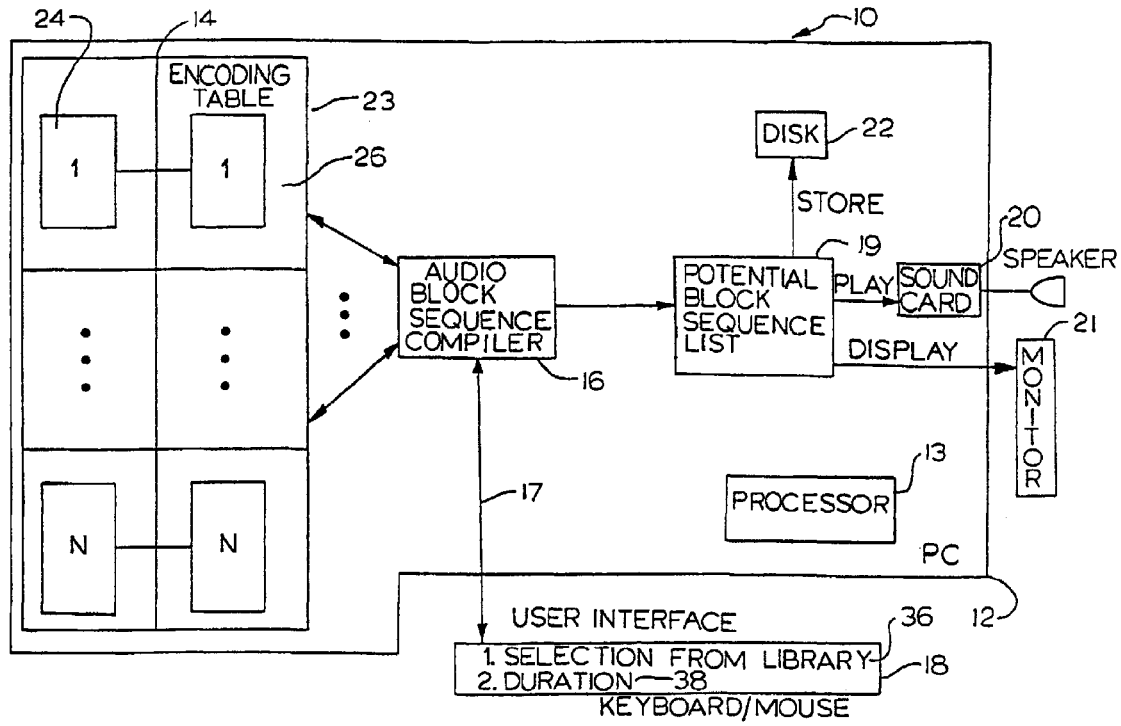

EX PARTE REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1-21 is confirmed.

* * * * *